Dec. 10, 1963  R. G. GARDINER  3,113,603
ROTARY CUTTER FOR REELING FRUIT
Filed Sept. 11, 1961  2 Sheets—Sheet 1
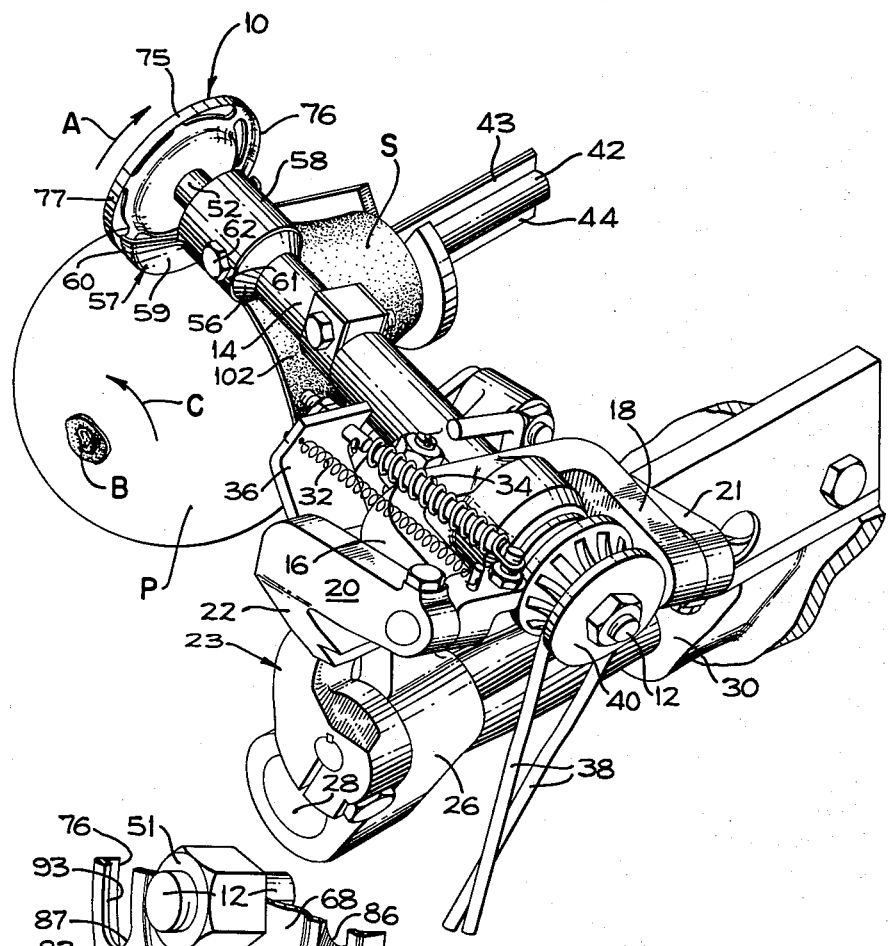
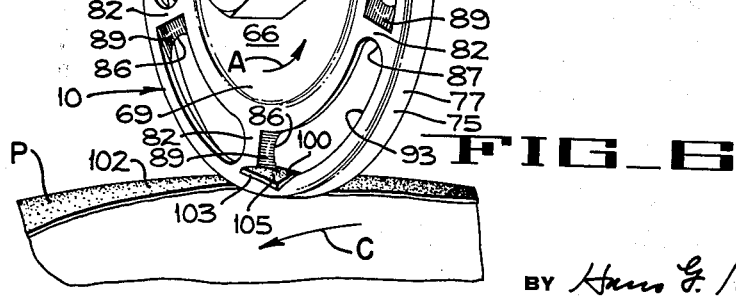
INVENTOR
RALPH G. GARDINER
BY *Hans G. Hoffmeister*
ATTORNEY Dec. 10, 1963 R. G. GARDINER 3,113,603
ROTARY CUTTER FOR REELING FRUIT
Filed Sept. 11, 1961 2 Sheets-Sheet 2
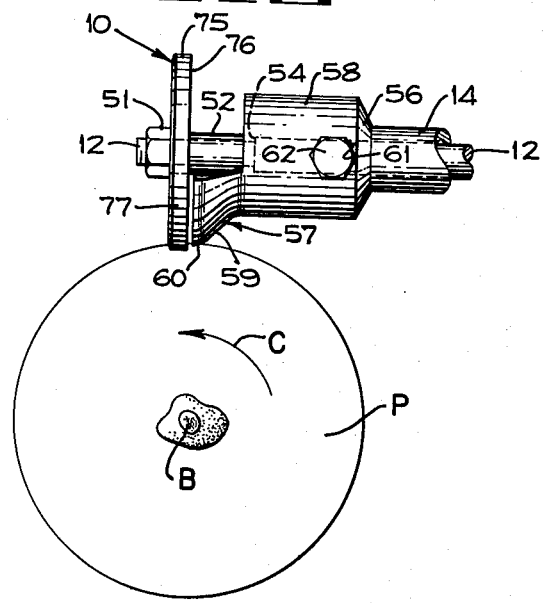
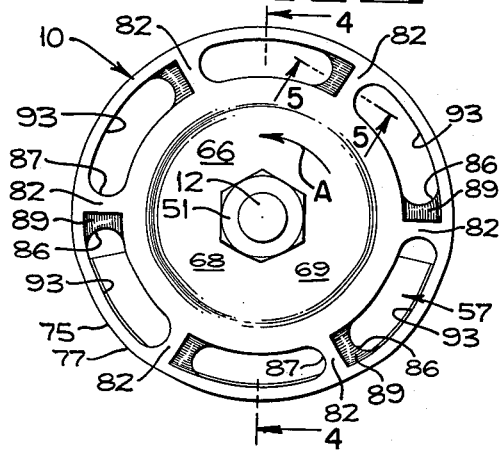
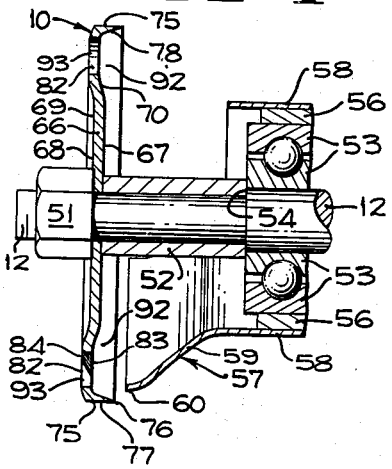
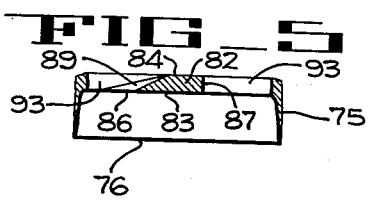
INVENTOR
RALPH G. GARDINER
BY Hans G. Hoffmeister
ATTORNEY

United States Patent Office 3,113,603
Patented Dec. 10, 1963

3,113,603
ROTARY CUTTER FOR PEELING FRUIT
Ralph G. Gardiner, San Jose, Calif., assignor to FMC Corporation, San Jose, Calif., a corporation of Delaware
Filed Sept. 11, 1961, Ser. No. 137,127
1 Claim. (Cl. 146—43)

The present invention pertains to apparatus for processing fruit and more particularly relates to a rotary cutter for peeling fruit, such as pears and the like.

Certain rotary cutters for pear peeling machines have been designed in such a way that a ribbon of peel is cut from the pear, and curls back upon itself as a continuous ribbon of peel. Quite frequently, this ribbon of peel clogs the cutter and other parts of the machine and requires that the machine be shut down for cleaning and repairs more often than is desired. Also, it has been discovered that in this type of cutter wherein the ribbon of peel curls back upon itself at the cutter, this curling tends to obstruct the cutter so that the cutter tends to rip, rather than cut, the peel from the fruit resulting in a poorly peeled pear with a rough surface.

It is, therefore, one object of the present invention to provide an improved rotary cutter for peeling fruit.

Another object is to provide an improved rotary cutter arranged to prevent curling of the fruit peel.

Another object is to provide a rotary cutter arranged to chop the peeling into short pieces for more easily clearing the peel from the fruit.

Another object is to provide a rotary cutter having openings therein through which the peel is directed and is cut into small pieces.

These and other objects and advantages of the present invention will become apparent from the following description and the accompanying drawings, in which:

FIG. 1 is a fragmentary perspective showing the rotary cutter of the present invention mounted on a movable support mechanism and disposed in peeling contact with a pear that is mounted on a rotatable impaling tube.

FIG. 2 is a side elevation of the rotary cutter of the present invention said cutter being shown mounted on a support member and disposed in contact with the surface of a pear being peeled.

FIG. 3 is an enlarged end elevation of the cutter of FIG. 2.

FIG. 4 is a section taken along line 4—4 of FIG. 3.

FIG. 5 is a section taken along line 5—5 of FIG. 4 and showing a sharpened knife for cutting the peel into pieces.

FIG. 6 is an enlarged perspective showing a portion of the cutter of the present invention in operation.

The improved rotary cutter 10 of the present invention is shown in FIG. 1 secured to a shaft 12 which is journalled for rotation in a tubular support arm 14. The arm 14 is provided at one end with a pair of spaced arms 16 and 18 which are pivotally mounted in arms 20 and 21, respectively, of a yoke 22 that is part of a cutter actuating and control mechanism 23 disclosed in the United States Patent 2,984,274 to Creed et al., dated May 16, 1961.

In general, the actuating mechanism 23 comprises a bracket 26 which has a flange (not shown) on which the yoke 22 is pivotally mounted. The bracket 26 is secured to a rod 28 that is mounted for sliding movement in a fixed bracket 30. When the rod 28 is slid toward the right (FIG. 1) into the bracket 30, the cutter 10 is moved from a position adjacent the blossom end B of a pear P to the stem end S. During its movement along the pear, the cutter 10 is held in contact with the surface of the pear by two springs 32 and 34 which are connected between the arm 16 and a bracket 36 secured to the yoke 22. The cutter is rotated, as it moves along the pear, by a power driven belt 38 that is trained around a pulley 40 keyed to the cutter shaft 12. The pear P is held on a rotatable impaling tube 42 that has drive fins 43 and 44. The drive belt 38, the cutter actuating and control mechanism 23, and the impaling tube 42 are driven and controlled in a suitable manner, such as by the drive mechanism fully described in the above-mentioned patent.

As more particularly shown in FIGS. 2, 3, and 4, the cutter 10 is mounted on the shaft 12 by a nut 51 which is screwed on the shaft and clamps the cutter 10 against one end of a sleeve 52 on the shaft. The other end of the sleeve 52 bears against the inner race of a bearing 53 and against a shoulder 54 on the shaft 12. The bearing 53 is secured in a housing 56 which is integral with the arm 14.

A depth gauge 57 which determines the peel thickness is supported on the housing 56. The depth gauge includes a cylindrical sleeve 58 fitted on the housing 56, a fractionally frusto-conical segment 59 divergently projecting from the sleeve 58, and a fractionally cylindrical gauging flange 60 projecting from the segment 59 and providing an arcuate gauging surface. The sleeve 58 has diametrically opposed slots 61, only one of which is shown, at the opposite end thereof from the segment. Capscrews 62 extend through the slots 61 and are screwed into threaded holes in the housing 56 thereby securing the gauge 57 to the arm 14.

As mentioned previously, it is desirable to prevent the peel from forming into a long ribbon which is apt to clog the cutter 10 and, also, it is undesirable to peel the pear P in such a way that the peel will curl rearwardly from the cutter. Accordingly, the cutter 10 of the present invention cuts the peel into small pieces, and prevents the above-mentioned curling of the peel.

Therefore, the rotary cutter 10 (FIGS. 3 and 4) includes a circular mounting member or disc 66 having a front surface 67 and a back surface 68. Further, the mounting member has a substantially flat, inner portion 69 circumscribing the shaft 12 and clamped between the nut 51 and the sleeve 52. The mounting member also has a frusto-conical outer shoulder 70 integral with the inner portion and divergently rearwardly projecting therefrom (FIG. 4).

In addition, the cutter 10 provides an annular, generally cylindrical blade 75 (FIGS. 3 and 4) concentrically circumscribing the mounting member 66 and uniformly circumferentially spaced from the outer shoulder 70. The blade (FIG. 4) is tapered axially of the shaft 12 and projects forwardly out of the plane of the mounting member to an annular cutting edge 76. The blade has an outer, cylindrical fruit engaging surface 77 and an inner substantially frusto-conical peel guiding surface 78 diverging from said cutting edge 76. The blade 75 is mounted so that its peripheral surface is generally tangential to the surface of the fruit.

Still further, it is of primary significance that the cutter 10 includes a plurality of knives 82 (FIGS. 3 and 4) rigidly interconnecting the outer shoulder 70 of the mounting member 66 and the blade 75. The knives are radially related to the shaft 12, are substantially equally spaced about the shaft, have front and back surfaces 83 and 84 (FIGS. 4 and 5), respectively, and are in a substantially common plane parallel to the inner portion 69 (FIG. 4). Furthermore, the knives have concave knife edges 86 facing in a common direction circumferentially of the shaft and opposite edges 87. The knives also have beveled peel guiding surfaces 89 extending from their knife edges to the back surfaces 84 of the knives.

It is evident from the above description of the cutter 10 that the cutter provides an annular channel, generally indicated by the numeral 92 (FIG. 4), which is defined by the outer shoulder 70, the blade 75, and the knives 82. It is also of significance that the blade, the blade mounting member 66, and opposed knife edges 86 and 87 of adjacent knives define a plurality of arcuate slots 93.

As best seen in FIG. 4, the radial distance between the cutting edge 76 and the shaft 12 is slightly greater than the maximum radial dimension of the gauging flange 60 so that the cutting edge of the blade is spaced slightly outward from the gauging flange. This spacing relationship establishes the thickness of the peel which is cut from the pear, as will be seen.

In operation, the pear P (FIG. 1) is impaled on the tube 42 with its stem blossom axis coaxial with the tube, and the pear is rotated in the direction of the arrow C. The cutter 10 is rotated in the direction of the arrow A; although the invention is not limited to a particular speed, it is to be noted that the subject cutter is highly successful for relatively slow speed cutting operations typified by a speed of approximately 1700 r.p.m. When the cutter is in cutting engagement with the pear, the cutter is in substantially the same plane as the impaling tube, and the tube and the shaft are substantially perpendicular to each other. The pear is normally peeled from the blossom end toward the stem end, but for the purposes of the present description, it is assumed that the cutter has partially peeled the pear and is at a position between the blossom and stem end portions of the pear.

As the pear P is moved toward the cutting edge 76 of the blade 75, the blade cuts a continuous, narrow strip 100 (FIG. 6) of peel 102 circumferentially of the stem blossom axis of the fruit. As above indicated, the thickness of the peel is determined by the spacing between the gauging flange 60 and the cutting edge 76, it being understood that the gauging flange rides on the peel immediately in advance of the blade 75.

One of the most important advantages of the subject cutter 10 is that as the strip 100 of peel is cut from the flesh of the pear P, the leading end 103 of the strip is guided by the channel 92, and particularly by the surface 78, through one of the slots 93 where a piece 105, shown partially cut from the strip 100 in FIG. 6, is chopped off by the knife edge 86 of an advancing knife 82. In like manner, the freshly cut strip is continuously guided through the slots and is successively cut into short pieces which are thrown from the cutter by the beveled surfaces 89. It is further of significance that the bevel of the surfaces 89 causes the pieces of the peel to be thrown from the cutter along lines obliquely related to the shaft 12.

From the foregoing description, it is apparent that an improved rotary cutter for peeling fruit, such as pears, has been provided. The subject cutter avoids curling of the fruit peel and consequent clogging of the cutter and of other parts of the fruit processing machine. Because the cut strip of peel is allowed to move naturally and freely through the cutter and is immediately cut into short pieces and thrown from the cutter, resistance to rotation of the cutter is minimized. Such free movement and discharge of the peel also obviates ripping of the peel from the fruit. Accordingly, use of the subject cutter produces peeled fruit having an improved appearance as compared with certain prior art rotary cutters. In addition, the short pieces of peeling are easy to handle for purposes of disposal.

While one embodiment of the present invention has been shown and described, it will be understood that various changes and modifications may be made without departing from the spirit of the invention or the scope of the appended claim.

The invention having thus been described, what is believed to be new and desired to be protected by Letters Patent is:

A rotary fruit cutter for peeling a fruit having a stem-blossom axis, rotatable fruit supporting means for supporting the fruit and rotating the fruit in a predetermined direction about said stem-blossom axis, a rotatable cutter shaft disposed in spaced relation to and having an axis of rotation in a plane transverse to the axis of said rotatable fruit support means, a circular disc secured to said shaft and disposed perpendicular thereto, said disc including a central planar portion surrounding the shaft, a plurality of arms extending radially from said central planar portion and disposed in a common plane close to and substantially parallel to the plane of said central portion, cutting edges on said arms, said edges being disposed in a plane perpendicular to the axis of said shaft, and a generally cylindrical cutter secured to the outer ends of said arms and tangentially engaging the periphery of the fruit, said cutter having a sharpened peripheral edge projecting outwardly from the plane of said disc in a direction opposing the direction of movement of the peripheral surface of the fruit during rotation of the fruit, the rotation of the fruit in said predetermined direction causing the strip of peel to move toward the sharpened edge of said cutter and be cut from the fruit and to move axially through the disc between said arms whereby the cutting edges on said arms sever the strip into a plurality of pieces and direct the pieces outwardly away from the rotating fruit cutter.

References Cited in the file of this patent

UNITED STATES PATENTS

| | | |
|---|---|---|
| 1,872,731 | Goranson et al. | Aug. 23, 1932 |
| 3,001,562 | Anderson | Sept. 26, 1961 |
| 3,013,595 | Boyce | Dec. 19, 1961 |